United States Patent Office 3,489,675
Patented Jan. 13, 1970

3,489,675
FIXED BED CRACKING
Charles E. Scott, Chester, Pa., assignor to Air Products and Chemicals, Inc., Philadelphia, Pa., a corporation of Delaware
No Drawing. Filed Aug. 22, 1967, Ser. No. 662,306
Int. Cl. C10g 11/02, 11/20
U.S. Cl. 208—120                                    4 Claims

ABSTRACT OF THE DISCLOSURE

Gas oil having a boiling point range above about 200° C. and below about 530° C. is vaporized and mixed with steam constituting from about 15 to about 100% of the weight of gas oil. Such mixed vapor contains about 55–99% inert diluent gas (steam) and 1–45% oil vapor by volume. The preheated mixture is directed through a fixed bed of faujasite-containing catalyst particles to crack the hydrocarbons at a temperature within the range from about 470° C. to about 540° C. during a period from about 1 to about 48 hours, after which a fixed bed of catalyst is regenerated to burn the coke deposit therefrom. Prolonged operation prior to catalyst regeneration is attained by reason of the combination of the high selectivity of the fresh faujasite-containing cracking catalyst, the high concentration of diluent (e.g. steam), the low boiling point of the gas oil feed, the maintenance of vapor phase cracking conditions, and the activity and selectivity of the coke-contaminated faujasite-containing catalyst in the period prior to burning of the coke deposit therefrom.

In the early days of catalytic cracking, a timed cycle was scheduled to provide regeneration of a fixed bed of cracking catalyst after from about 5 to 20 minutes of cracking operation. The problems connected with such frequent regeneration led to the development of the gravitating bed and the fluidized bed, so that the last of the fixed bed cracking units for refinery-scale cracking was abandoned many years ago. In each of the systems in which the catalyst is moved from a cracking zone to a regeneration zone, the capital equipment involved in the catalyst circulation sometimes represents a greater investment than the capital connected with the zone of the cracking reaction. In recent years, the superior selectivity of molecular sieve type of cracking catalyst has been found advantageous both in the fluidized bed and in the gravitating bed type of operation.

Since the development of cracking catalyst featuring molecular sieves, there has been a recognition that the high activity crystalline cracking catalyst had special requirements which had to be weighed in relation to the advantageous selectivity and activity of such catalyst. One of the disadvantages which has been well established in connection with the molecular sieve type of high activity catalyst has been the requirement for minimizing the concentration of carbonaceous deposit on the catalyst. In discussing the advances in catalytic cracking at page 367 of the Oil and Gas Journal on May 27, 1967, it was explained that "The new zeolitic high-activity catalysts so far work best at short catalyst/oil contacting times and with good regeneration to as low as 0.3 wt. percent C on the catalyst or less . . .,"

The silica-alumina catalysts which were employed industrially prior to the availability of molecular sieve catalysts, and which are continuing to share the market for cracking catalysts can be regenerated satisfactorily even though the residual carbonaceous deposit is of the magnitude of 1.5%, or about 5 times greater than the maximum residual carbon recommended for the molecular sieve type of catalyst. It has been long known that the activity and selectivity of a cracking catalyst were dependent in part upon the amount of coke thereto for deposited therein. Very freshly regenerated catalysts, containing an amount of carbonaceous deposit which is the residual amount not readily consumed by the regeneration procedure, is measurably more active and selective than the catalyst on which the coke has deposited throughout all of the cracking period of the system. In planning systems for the cracking of hydrocarbons, the coke tolerance of the catalyst has been among the characteristics considered in designing the residence time for the catalyst particle in the cracking zone.

In recent years it has been known that the coke tolerance of the commercially employed silica alumina cracking catalyst permitted on-stream cracking operation periods of from about 5 to about 20 minutes, thus requiring regeneration from about 72 to about 300 times per day. The coke tolerance, regeneration frequency requirements, etc. favored operation of fluidized systems and of gravitating bed systems for catalytic cracking. However, fixed bed systems using silica-alumina catalysts are economically unattractive by reason of the necessity for frequency of regeneration of several times per hour, that is a maximum on-stream cracking period of less than about 20 minutes. The catalytic properties of a catalyst are not utilized effectively if the coke tolerance is exceeded. The experience gained during the production of millions of gallons of gasoline over molecular sieve high-activity catalyst indicated that such catalysts were even more unacceptable for fixed bed systems than silica alumina catalyst by reason of the need for such low levels of residual coke in the regeneration step and by reason of the need for regeneration after the accumulation of relatively small amounts of coke. Surprisingly, however, it has been discovered in accordance with present invention that a fixed bed cracking system utilizing molecular sieve high-activity catalyst is feasible and achieves significant engineering advantages.

STATEMENT OF INVENTION

In accordance with the present invention, the vapors of hydrocarbons boiling above about 200° C. and below about 530° C. are subjected to cracking over a fixed bed of acidic cracking catalyst particles, and the invention is concerned with the improvement which includes: preparing a mixture of hydrocaron vapors and diluent gas such as steam, the diluent constituting at least 50% but less than 99% by volume of such mixture; preheating the mixture of hydrocarbon vapor and diluent; directing the thus preheated mixture of hydrocarbon vapor and diluent gas through a cracking zone containing at least one fixed bed of catalyst particles containing faujasitic-type zeolite, which particles are hereinafter designated as faujasite-containing catalyst, to crack the hydrocarbons at a temperature within the range from about 425° C. to about 590° C.; continuing the flow of the mixture of hydrocarbon vapor and diluent gas through the faujasite-containing catalyst particles for a period of from about 1 to about 48 hours while withdrawing vapors comprising cracked products from the faujasite-containing catalyst particle fixed bed; recovering hydrocarbons from the effluent from the cracking zone, said hydrocarbons having an average boiling point lower than the feed stock, and comprising normally liquid hydrocarbon boiling below 200°.; regenerating a bed of faujasite-containing catalyst particles by passage of gas mixture comprising oxygen through the bed, the quantity of oxygen being sufficiently restricted to maintain the temperature of the catalyst bed undergoing regeneration below about 760° C.; and employing the thus regenerated fixed bed of faujasite-containing cracking catalyst particles for the cracking of hydrocarbon vapors in the presence of the diluent gas.

The invention is further clarified by reference to a plurality of examples.

Examples I–XI

An apparatus similar to the type described in an article entitled "To Test Catalytic Cracking Activity" by C. G. Harriz in the October 1966 issue of Hydrocarbon Processing was modified to handle requirements and employed in a procedure involving prolonged fixed bed cracking for a period of 330 minutes or 5½ hours. Some of the variables which were studied included: the quantity of steam as a percentage of the weight of a hydrocarbon vapor; temperature of the cracking zone; boiling point range of the stock; and type of catalyst.

The feed stocks were evaluated and given arbitrary designations as indicated in Table I.

TABLE I.—FEED STOCK INSPECTIONS

|  | a | b | c | d | e | f | g | h |
|---|---|---|---|---|---|---|---|---|
| API Gravity | 30.2 | 29.6 | 29.3 | 30.4 | 35.3 | 33.0 | 30.7 | 28.0 |
| Dist., °F.: |  |  |  |  |  |  |  |  |
| Init | 39 | 472 | 210 | 252 | 472 | 478 | 460 | 479 |
| 5% | 540 | 535 | 504 | 492 | 504 | 507 | 510 | 510 |
| 10% | 575 | 553 | 534 | 530 | 513 | 524 | 520 | 526 |
| 20% | 610 | 569 | 559 | 553 | 527 | 544 | 555 | 578 |
| 30% | 642 | 580 | 574 | 569 | 541 | 568 | 595 | 623 |
| 40% | 685 | 592 | 586 | 582 | 556 | 595 | 633 | 670 |
| 50% | 722 | 605 | 598 | 595 | 576 | 624 | 675 | 726 |
| 60% | 760 | 620 | 614 | 611 | 593 | 652 | 717 | 778 |
| 70% | 792 | 637 | 633 | 632 | 616 | 677 | 753 | 837 |
| 80% | 832 | 661 | 660 | 657 | 640 | 712 | 802 | 903 |
| 90% | 870 | 700 | 702 | 698 | 675 | 752 | 846 | 975 |
| 95% | 890 | 740 | 740 | 733 | 702 | 782 | 875 | 1,036 |
| Wt. Percent Sulfur | 0.30 | 0.34 | 0.22 | 0.11 | 1.38 | 1.69 | 1.83 | 2.28 |
| Anil. Pt., °F | 182.3 | 163.6 | 158.0 | 159.8 | 159.2 | 162.2 | 165.0 | 169.2 |
| Brom. No | 1.1 | 0.5 | 1.5 | 0.4 | 1.5 | 1.7 | 2.2 | 3.1 |
| Rams. Carbon, Percent | 0.09 | 0.32 | 0.13 | 0.08 | 0.08 | 0.09 | 0.11 | 0.39 |
| Wt. Percent: |  |  |  |  |  |  |  |  |
| Arom | 19 | 22 | 23 | 22 | 23 | 24 | ND | ND |
| Olef | 2 | 1 | 2 | 1 | 2 | 3 |  |  |
| Naph | 79 | 77 | 75 | 77 | 56 | 53 |  |  |
| Par | 0 | 0 | 0 | 0 | 19 | 20 |  |  |

The gas oil designated as (a) was treated at a liquid hydrocarbon space velocity of 1 volume of liquid gas oil per volume of catalyst per hour at about atmospheric pressure during a 5½ hour cycle. In Examples I and II, the tests were conducted to determine the effect of a change of temperature while using 50% by weight of steam. As shown in Table II, calcined kaolin cracking catalyst known as Kaosphere catalyst was employed in the fixed bed in the control tests, and in the examples of the present invention, the fixed bed of catalyst contained a commercial cracking catalyst known as HZ–1, comprising hydrogen faujasite in an alumino silicate matrix.

TABLE II.—CATALYST

|  | Kaolin |  | Faujasite-containing | |
|---|---|---|---|---|
|  |  |  | Ex. I | Ex. II |
| °C | 495 | 510 | 495 | 510 |
| Percent Conv | 21.7 | 24.9 | 50.1 | 59.3 |
| Wt. percent C₂ and lighter | 0.9 | 1.2 | 1.6 | 2.0 |
| Wt. percent C₃ | 1.3 | 1.7 | 4.9 | 6.6 |
| Olefins Wt. percent of C₃ and lighter | 63.0 | 62.0 | 69.2 | 71.7 |
| Wt. percent C₄ | 2.4 | 3.3 | 9.0 | 11.8 |
| Vol. percent C₄ | 3.5 | 4.7 | 13.1 | 17.0 |
| Wt. percent C₅+ gasoline | 17.1 | 18.7 | 34.6 | 38.9 |
| Vol. percent C₅+ gasoline | 19.3 | 21.6 | 40.5 | 45.6 |
| Percent Coke on Cat. at 5½ hours | 3.0 | 4.4 | 2.9 | 3.8 |

A review of the data points out that the use of a faujasite-containing catalyst permits the attainment of a significantly superior conversion of gas oil and a significantly superior yield of gasoline under the specified conditions of 50% steam in the hydrocarbon stream. For example, the gasoline product was approximately twice as great during the build up of approximately the same magnitude of coke on the catalyst.

In Examples III and IV, conditions resembling those of Examples I and II were followed except that the amount of steam was 100% by weight of the hydrocarbon instead of 50% by weight of hydrocarbon. The results were as indicated in Table III.

TABLE III.—CATALYST

|  | Kaolin | | Faujastie-containing | |
|---|---|---|---|---|
|  |  |  | Ex. III | Ex. IV |
| °C | 495 | 510 | 495 | 510 |
| Percent Wt. Conv | 21.5 | 22 | 54.1 | 59.7 |
| Wt. percent C₂ and lighter | 0.8 | 0.9 | 1.6 | 1.7 |
| Wt. percent C₃ | 1.3 | 1.6 | 6.0 | 6.5 |
| Olefins, Wt. percent of C₃ and lighter | 70.3 | 70.3 | 80.0 | 79.8 |
| Wt. percent C₄ | 2.5 | 3.1 | 10.4 | 11.9 |
| Vol. percent C₄ | 3.5 | 4.5 | 14.5 | 17.2 |
| Wt. percent C₅+ gasoline | 16.9 | 16.4 | 36.1 | 39.6 |
| Vol. percent C₅+ gasoline | 19.4 | 18.6 | 41.4 | 46.8 |
| Coke, Wt. percent of Cat. after 5½ hours | ND | 3.1 | 3.1 | 3.3 |

A review of the data indicates that the faujasite-containing catalyst is significantly superior to that of the kaolin catalyst in the presence of steam constituting about 100% weight of the gas oil. A comparison of Examples II and IV indicates that the gasoline to coke ratio is increased by the larger amount of steam, but that such increase is small in relation to the difference attributable to the use of HZ–1 instead of Kaospheres.

The applicability of the method of using the faujasite-containing catalyst in the presence of 100% by weight steam at about 495° C. at a space rate of 1 liquid volume of hydrocarbon per volume of catalyst per hour was shown by the cracking of several gas oils as indicated in Tables IV and V.

TABLE IV

| Examples | V | VI | VII | VIII |
|---|---|---|---|---|
| Feed Stock | b | c | d | e |
| Wt. percent Conv | 72.2 | 67.1 | 70.5 | 62.1 |
| Wt. H₂, C₁, C₂ | 2.0 | 0.7 | 2.2 | 1.7 |
| Wt. percent C₃ | 9.1 | 7.8 | 10.0 | 8.3 |
| Olefins C₃ and lighter | 79.3 | 91.8 | 80.7 | 83.0 |
| Wt. percent C₄ | 15.0 | 13.1 | 16.2 | 14.2 |
| Vol. percent C₄ | 21.7 | 19.0 | 23.4 | 19.9 |
| Wt. percent C₅+ gasoline | 46.1 | 45.5 | 42.1 | 37.9 |
| Vol. percent C₅+ gasoline | 53.0 | 52.4 | 52.1 | 42.8 |
| Coke, Wt. percent of Cat | 4.4 | 3.1 | 3.9 | 2.6 |

TABLE V

| Examples | IX | X | XI |
|---|---|---|---|
| Feed Stock | f | g | h |
| Wt. percent Conv | 56.8 | 54.1 | 49.3 |
| Wt. H₂, C₁, C₂ | 1.7 | 1.6 | 1.7 |
| Wt. percent C₃ | 6.8 | 6.2 | 4.6 |
| Olefins C₃ and lighter | 80.6 | 81.5 | 75.8 |
| Wt. percent C₄ | 12.1 | 9.4 | 8.1 |
| Vol. percent C₄ | 17.2 | 13.6 | 11.9 |
| Wt. percent C₅+ gasoline | 36.2 | 36.9 | 43.9 |
| Vol. percent C₅+ gasoline | 41.3 | 44.4 | 41.4 |
| Coke, Wt. percent of Cat | 3.5 | 3.1 | 3.3 |

The same catalyst sample was employed throughout Examples I–XI, and it was noted that the catalyst showed no evidence of loss of surface area, thus being consistent with the commercially established stability of HZ–1 catalyst.

By a series of tests, it is established that: the boiling point range of the feed stock must be above about 200° C. and below about 530° C.; the volume concentration of diluent gas must be from 50% to 99%; the cracking zone must be maintained in the range from about 470° C. to about 540° C.; the on-stream cracking operation must be continued for from 1 hour to 48 hours prior to regeneration; and the oxygen concentration in the gas fed to the regeneration zone must be restricted to assure a flame front peak temperature below about 760° C. in the catalyst bed.

Although steam is the preferred diluent gas, the superior results are attributable in part to the low partial pressure of gas oil vapor in the stream entering the cracking zone. Nitrogen has been successfully employed as diluent gas in long cycle fixed bed cracking of a light gas oil similar to e. Argon, carbon dioxide, gas mixtures, and other diluent gases which would not significantly react with the gas oil or gasoline at cracking conditions may be utilized instead of steam.

Example XII

A fixed bed of cracking catalyst was employed for the cracking of heavy East Texas gas oil to determine the effect of elevated temperature and high severity of cracking conditions. The unit was operated at a liquid hydrocarbon space velocity of 1 volume of gas oil per volume of cracking catalyst per hour. The mixture directed to the bed of HZ–1 catalyst consisted of the vapor of heavy East Texas gas oil and steam, the weight ratio of the liquid gas oil to liquid water being approximately 1:1. The average molecular weight of the feed stock was from about 9 to 15 times the molecular weight of the steam. Hence, the stream directed to the catalyst consists of about 95% inert diluent gas (steam) and about 5% hydrocarbon vapor. The catalyst bed was heated to maintain a temperature of 504° C. (940° F.) during a series of runs of 90 minutes for establishing reproducibility and stability of operating conditions. Substantially all of the coke was laid down on the catalyst during the first 15 minutes, so that the terminal 75 minutes of operation over the partially coked catalyst provided an extremely high gasoline to coke ratio. The final coke production was 1.3% of the weight of the catalyst.

Particular attention is directed to the fact that 74.3% conversion was attained. The weight percent $C_5+$ gasoline was 48.3%, corresponding to 56.5% volume gasoline. The weight percent $C_4$ hydrocarbons was 15.5%, providing 22.3 volume percent $C_4$s. The olefin content of the $C_3$ fraction was 74.6 weight percent. Said $C_3$ fraction constituted 7.3 weight percent of the feed. The mixture of ethane, ethylene, methane, hydrogen, ammonia, hydrogen sulfide, etc. (e.g. $C_2$ and lighter) was only 2.8% of the hydrocarbon feed.

Such results indicated that a system featuring such 90 minute on-stream periods over a fixed bed of catalyst could produce a given quantity of gasoline using a smaller quantity of catalyst inventory, and smaller quantities of replacement catalyst per year than in conventional cracking of gas oil.

Example XIII

A pilot plant is designed for swing bed regeneration of HZ–1 catalyst. The gas oil vapors are mixed with steam, directed through a tube heater to the top of a fixed bed of cracking catalyst. The cracking reactions are endothermic, so that the effluent vapors are about 25° C. cooler than the input stream. After passing through another section of the heater to reheat the stream to the 515° C. cracking temperature, the stream flows downwardly through a second fixed bed of HZ–1 catalyst. Further interstage reheating of the stream and passage through a third catalyst bed provides an effluent sent to a distillation tower for the separation of the hydrocarbons into useful fractions, comprising residual bottoms, gas oil, naphtha, pentane, butane, propane, and light gas fractions. A fourth bed of cracking catalyst is undergoing regeneration while three beds are used for the cracking reaction. Each bed serves successively as last, intermediate, and first in the train of cracking reactors. The overall space rate for the three cracking reactor train is about 0.75 volume of gas oil per volume of catalyst per hour. The amount of steam is about 75% by weight of the gas oil. By reason of the lower cost of equipment required for the fixed bed system it offers significant advantages over any competitive design of cracking unit providing the same amount of gasoline from the same feed stock.

Various modifications of the invention are possible and the embodiments should be viewed as merely illustrative and not as limitations, inasmuch as the scope of the invention is defined in the claims.

The invention claimed is:

1. In the method of cracking hydrocarbons by the passage of hydrocarbons through a fixed bed of acidic cracking catalyst particles, the effluent stream from the cracking catalyst particles being processed to separate therefrom hydrocarbons having a boiling point range lower than the boiling point range of the feed stock hydrocarbons, and the carbonaceous deposit on the cracking catalyst particles being periodically burned to regenerate such cracking catalyst particles, the improvement which includes the steps of:

provcdng a stream of diluent gas which forms no compounds with the hydrocarbons at cracking conditions;

admixing the diluent gas with feed stock hydrocarbons to provide a vaporous mixture in which the diluent constitutes at least 50% but less than 99% by volume of the mixture, said feed stock hydrocarbons having a boiling point range above about 200°C. and below about 530°C.;

pre-heating said mixture of diluent gas and vaporous hydrocarbon;

directing the thus pre-heated mixture of diluent and hydrocarbon through a cracking zone containing at least one fixed bed of faujasite-containing catalyst particles to crack the hydrocarbon at a temperature from about 425°C. to about 590°C. at a space velocity of from about 0.5 to about 3 volumes of liquid gas oil per volume of catalyst particles in the cracking zone;

containing the flow of the mixture of hydrocarbons and diluent through the faujasite-containing catalyst particles for the exceptionally prolonged period of from about 1 to about 48 hours while withdrawing vapors comprising cracked products including hydrocarbons having a boiling point range lower than the boiling point range of the hydrocarbon feed stock;

recovering hydrocarbons from the effluent from cracking zone;

regenerating a bed of faujasite-containing catalyst particles subsequent to such a cracking operation for a period of about 1 to about 48 hours, such regeneration requiring the passage of a gas mixture comprising oxygen through the bed, the quantity of oxygen being sufficiently restricted to maintain the temperature of the catalyst bed undergoing regeneration below about 760° C.; and employing the thus regenerated fixed bed of faujasite-containing catalyst particles for additional cycles of cracking of hydrocarbons in a diluent gas mixture.

2. The method of claim 1 in which the cracking zone includes a series of beds of faujasite-containing catalyst, and the mixture of hydrocarbon vapor and diluent gas is pre-heated prior to each bed in the series.

3. The method of claim 2 in which steam is the diluent, and in which the hydrocarbon and steam are preheated to a temperature about 25°C. higher than the predetermined temperature of the effluent from the next bed of faujasite-containing cracking catalyst, said hydrocarbon stream undergoing sufficient endothermic cracking reactions to cool said effluent significantly.

4. The method of claim 2 in which at least one of the fixed beds of faujasite-containing cracking catalyst is undergoing regeneration during the utilization of other beds of faujasite-containing cracking catalyst in the cracking zone, the flow of gases to the fixed beds being adjusted intermittently, whereby hydrocarbon vapors are continuously cracked during a period of many weeks.

References Cited

UNITED STATES PATENTS

| | | | |
|---|---|---|---|
| 2,914,459 | 11/1959 | Mills et al. | 208—130 |
| 3,033,778 | 5/1962 | Frillette | 208—120 |
| 3,278,416 | 10/1966 | Dwyer et al. | 208—87 |

DELBERT E. GANTZ, Primary Examiner

A. RIMENS, Assistant Examiner

U.S. Cl. X.R.

208—128, 130

PO-1050
(5/69)

UNITED STATES PATENT OFFICE
CERTIFICATE OF CORRECTION

Patent No. 3,489,675      Dated January 13, 1970

Inventor(s) Charles E. Scott

It is certified that error appears in the above-identified patent and that said Letters Patent are hereby corrected as shown below:

Column 2, line 69, "200°" should read --200°C.--.

Column 6, line 50, "containing" should read --continuing--.

SIGNED AND
SEALED
JUN 23 1970

(SEAL)
Attest:

Edward M. Fletcher, Jr.
Attesting Officer

WILLIAM E. SCHUYLER, JR.
Commissioner of Patents